U S010358024B2

(12) United States Patent
Yugami et al.

(10) Patent No.: US 10,358,024 B2
(45) Date of Patent: Jul. 23, 2019

(54) ELECTRIC-DRIVE VEHICLE STRUCTURE

(71) Applicant: Mazda Motor Corporation, Aki-gun, Hiroshima (JP)

(72) Inventors: Toshimitsu Yugami, Hiroshima (JP); Ikuo Nonaka, Hiroshima (JP); Yoshiaki Noguchi, Hiroshima (JP); Koji Jahara, Higashihiroshima (JP); Takashi Hamada, Aki-gun (JP); Tadasuke Abe, Hatsukaichi (JP); Kazuki Hirota, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/128,771

(22) Filed: Sep. 12, 2018

(65) Prior Publication Data

US 2019/0084397 A1    Mar. 21, 2019

(30) Foreign Application Priority Data

Sep. 19, 2017    (JP) .................................. 2017-178734

(51) Int. Cl.
*B60K 5/10* (2006.01)
*B60K 1/04* (2019.01)
*B62D 21/15* (2006.01)

(52) U.S. Cl.
CPC .............. *B60K 1/04* (2013.01); *B62D 21/152* (2013.01); *B60K 2001/0411* (2013.01); *B60Y 2400/61* (2013.01)

(58) Field of Classification Search
CPC .... B60K 1/00; B60K 5/12; B60K 5/10; B60L 1/00
See application file for complete search history.

(56) References Cited

U.S. PATENT DOCUMENTS

| 5,992,555 | A  | * | 11/1999 | Sakamoto | B60K 5/1216 180/232 |
| 7,393,016 | B2 | * | 7/2008  | Mitsui    | B62D 25/08 180/232 |
| 7,874,395 | B2 | * | 1/2011  | Taji      | B60K 1/00 180/295 |
| 8,820,467 | B2 | * | 9/2014  | Lamoine   | B60K 1/00 180/299 |
| 8,851,223 | B2 | * | 10/2014 | Yamashita | B62D 21/155 180/291 |
| 9,010,479 | B2 | * | 4/2015  | Kambayashi | B60H 1/3223 180/291 |

(Continued)

FOREIGN PATENT DOCUMENTS

DE    102009040896 A1    3/2011
DE    102011113198 A1    3/2013

*Primary Examiner* — James A Shriver, II
*Assistant Examiner* — James J Triggs
(74) *Attorney, Agent, or Firm* — Alleman Hall Creasman & Tuttle LLP

(57) ABSTRACT

An electric-drive vehicle structure is provided, which includes a cross member bridged between side frames in a front part of a vehicle, a motor suspended below the cross member, a tray fixed to an upper surface of the cross member, and an electric unit for driving a motor, fixed onto the tray. A front edge of the electric unit is located forward of a front edge of the cross member, and the tray has a front edge located, throughout a width thereof, forward of the electric unit.

2 Claims, 8 Drawing Sheets

(56) References Cited

U.S. PATENT DOCUMENTS

| | | | |
|---|---|---|---|
| 9,266,424 B2* | 2/2016 | Golbs | B60K 5/1208 |
| 9,724,993 B2* | 8/2017 | Nakamura | B60K 6/40 |
| 10,071,772 B2* | 9/2018 | Sasaki | B62D 21/155 |
| 2002/0051549 A1* | 5/2002 | Uvacek | H04R 25/70 |
| | | | 381/312 |
| 2002/0096384 A1* | 7/2002 | Yoshida | B60K 5/12 |
| | | | 180/298 |
| 2002/0100622 A1* | 8/2002 | Shimizu | B60K 1/00 |
| | | | 180/65.1 |
| 2004/0046450 A1* | 3/2004 | Yoshida | B60K 5/1208 |
| | | | 307/10.1 |
| 2005/0079068 A1* | 4/2005 | Shigematsu | B60K 5/1216 |
| | | | 417/363 |
| 2008/0078603 A1* | 4/2008 | Taji | B60K 1/00 |
| | | | 180/312 |

* cited by examiner

ELECTRIC-DRIVE VEHICLE STRUCTURE

TECHNICAL FIELD

The present disclosure relates to a structure of an electric-drive vehicle which is driven by a motor. More specifically, the present disclosure relates to a structure of an electric-drive vehicle in which left and right front side frames extending in vehicle longitudinal directions are provided at both left and right sides inside a motor room disposed in a front part of the vehicle, a cross member extending in vehicle width directions is bridged between the left and right front side frames, an electric unit is placed on the cross member, and a vehicle driving motor to which electric power is supplied from the electric unit is suspended below the cross member.

BACKGROUND OF THE DISCLOSURE

Conventionally, electric-drive vehicles configured such that a motor room is formed in a front part of the vehicle, left and right front side frames extending in vehicle longitudinal directions are provided at both left and right sides of the motor room, an electric motor is disposed between the pair of left and right front side frames, and left and right wheels are driven by the electric motor as a power source, are known.

DE102009040896A1 and DE102011113198A1 disclose such electric-drive vehicles. DE102009040896A1 discloses an electric-drive vehicle in which left and right front side frames extending in vehicle longitudinal directions are provided at both left and right sides inside a motor room, a cross member extending in vehicle width directions is bridged between the left and right front side frames, and a vehicle driving motor is suspended below the cross member.

In DE102009040896A1, if an electric unit including an inverter is placed on the cross member, some parts, including a radiator, move rearward when a frontal collision of the vehicle occurs, and these rearwardly-moved parts collide with and damage the electric unit. Therefore, there is room for improvement.

DE102011113198A1 discloses an electric-drive vehicle in which a cross member is bridged in vehicle width directions via mount components between left and right front side frames inside a motor room, a vehicle driving motor is supported below the cross member, the cross member is formed in a square cylindrical container with a bottom at one end and opened the other, upper end, and an electric unit containing an inverter is accommodated in the cross member.

However, since in DE102011113198A1 the cross member is formed like a container, its mass becomes excessive. Therefore, there is room for improvement.

SUMMARY OF THE DISCLOSURE

Thus, one purpose of the present disclosure is to provide an electric-drive vehicle structure capable of protecting an electric unit by catching rearwardly-moving part(s) which are located forward by a tray when a frontal collision of the vehicle occurs.

According to one aspect of the present disclosure, an electric-drive vehicle structure is provided, which includes a cross member bridged between side frames in a front part of the vehicle, a motor suspended below the cross member, a tray fixed to an upper surface of the cross member, and an electric unit for driving a motor, fixed onto the tray. A front edge of the electric unit is located forward of a front edge of the cross member. The tray has a front edge located, throughout a width thereof, forward of the electric unit.

The electric unit may be set to an inverter for converting DC power at high voltage supplied from a main battery into 3-phase AC power, a junction box having a relay circuit therein, etc.

According to this structure, since the front edge of the tray is located, throughout its width, forward of the case of the electric unit in a plan view, one or more rearwardly-moving part(s) may contact the front edge of the tray prior to other components, when a frontal collision of the vehicle occurs, and thereby the rearwardly-moving part(s) may be caught. As a result, the electric unit can be protected by the front edge of the tray.

The front edge of the tray may be a wall part rising substantially vertically.

According to this structure, since the rearwardly-moving part(s) are securely caught by the front edge of the wall-like tray which rises substantially vertically from the bottom surface thereof, the electric unit can be protected more effectively.

A longitudinal dimension of the tray may be greater than a longitudinal dimension of the cross member. The tray may have attachment pieces aligned with attachment seats provided to a lower part of the electric unit, at locations forward of the cross member and rearward of the cross member.

The tray may have a first bottom part fastened to the upper surface of the cross member, and a second bottom part that is formed continuously from a front part of the first bottom part and located higher than the first bottom part. The attachment seats may be provided to the second bottom part.

According to this structure, since the bottom surface of the tray is formed in the stepped structure with the first bottom part and the second bottom part, the bottom surface of the tray can be reinforced.

DETAILED DESCRIPTION OF THE DISCLOSURE

The purpose of catching rearwardly-moving part(s) located forward by a tray to protect an electric unit, when a frontal collision of a vehicle occurs, is achieved by an electric-drive vehicle having the following structure:

The structure includes left and right front side frames extending in vehicle longitudinal directions at both left and right sides inside a motor room disposed in a front part of the vehicle. A cross member extending in vehicle width directions is bridged between the left and right front side frames. An electric unit is placed on the cross member, and a vehicle driving motor to which electric power is supplied from the electric unit is suspended below the cross member. A longitudinal dimension of the electric unit is greater than a longitudinal dimension of the cross member, and a front edge of a case of the electric unit is, when installed, located forward of a front edge of the cross member. A tray having a bottom surface which provides a fixed part for a lower part of the electric unit is attached to an upper surface of the cross member. The tray has a front edge located, throughout its width, forward of a front edge of the case of the electric unit in a plan view.

[Embodiment]

Below, one embodiment of the present disclosure is described in detail based on the accompanying drawings. Throughout the figures, an arrow F indicates "forward" or "front" in the vehicle longitudinal directions, and an arrow R indicates "rearward" or "rear" in the vehicle longitudinal directions.

Figure 1:
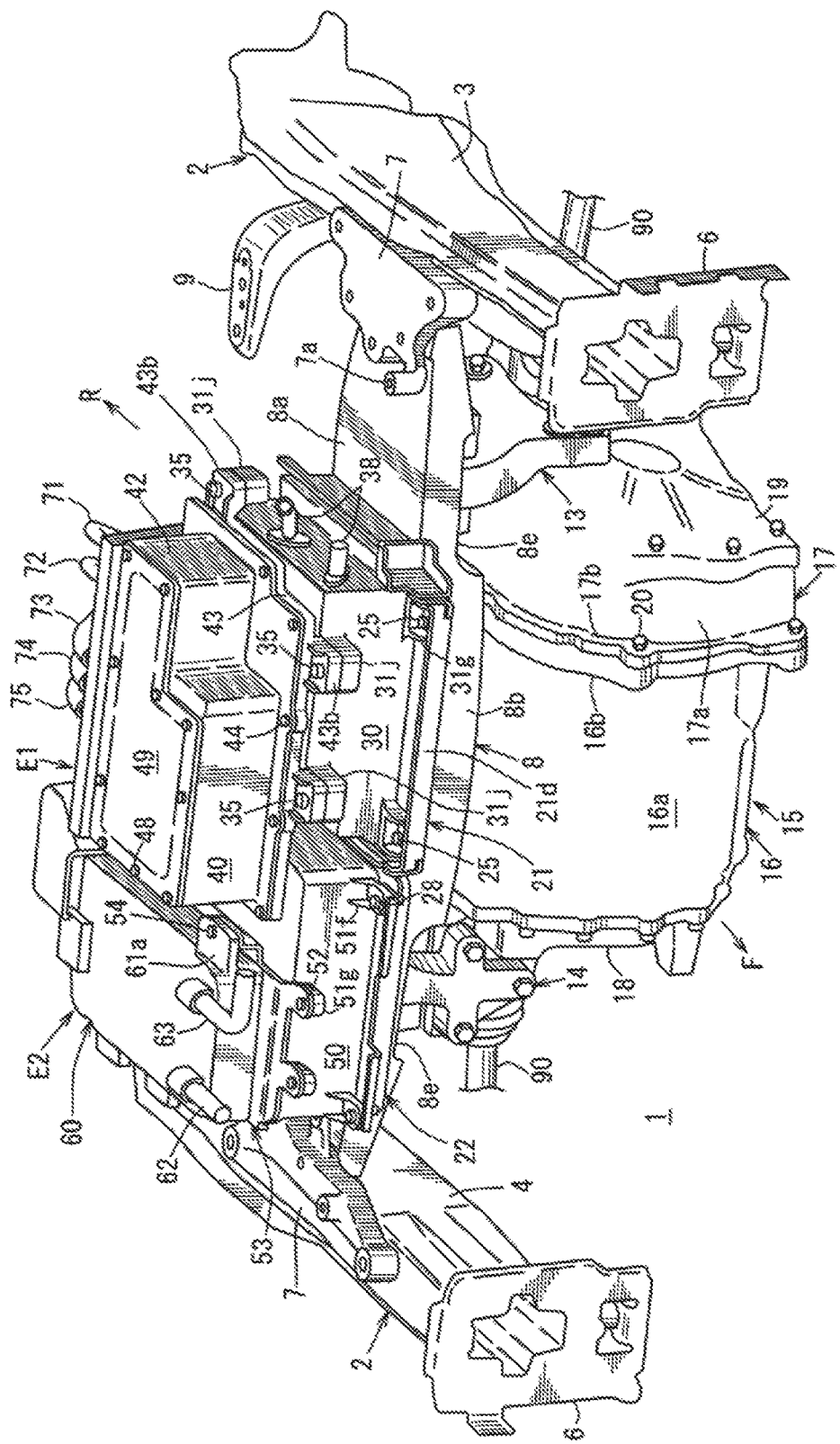
FIG. 1 is a perspective view illustrating an electric-drive vehicle structure of the present disclosure.
Figure 2:
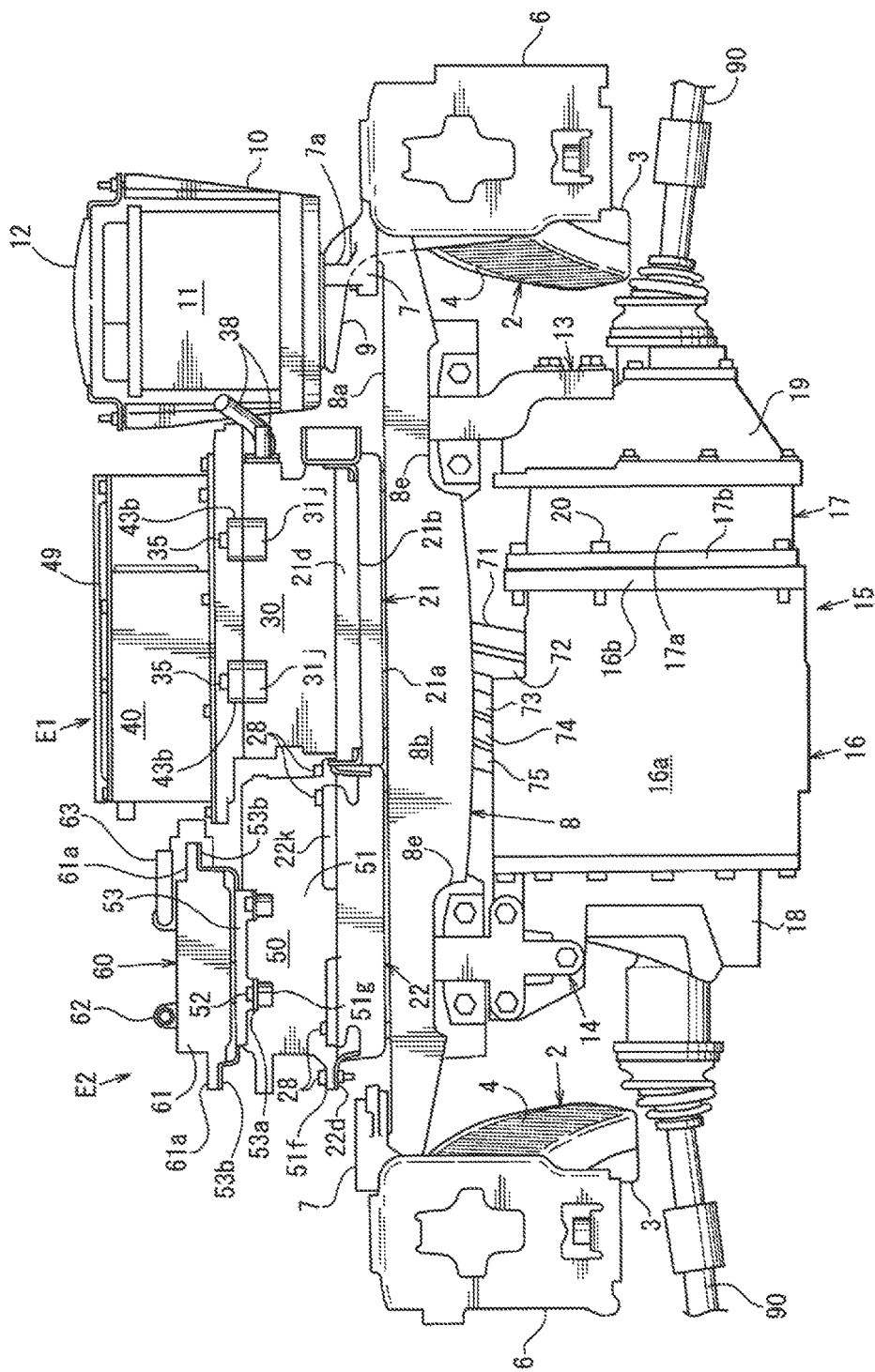
FIG. 2 is a front view of the electric-drive vehicle structure.
Figure 3:
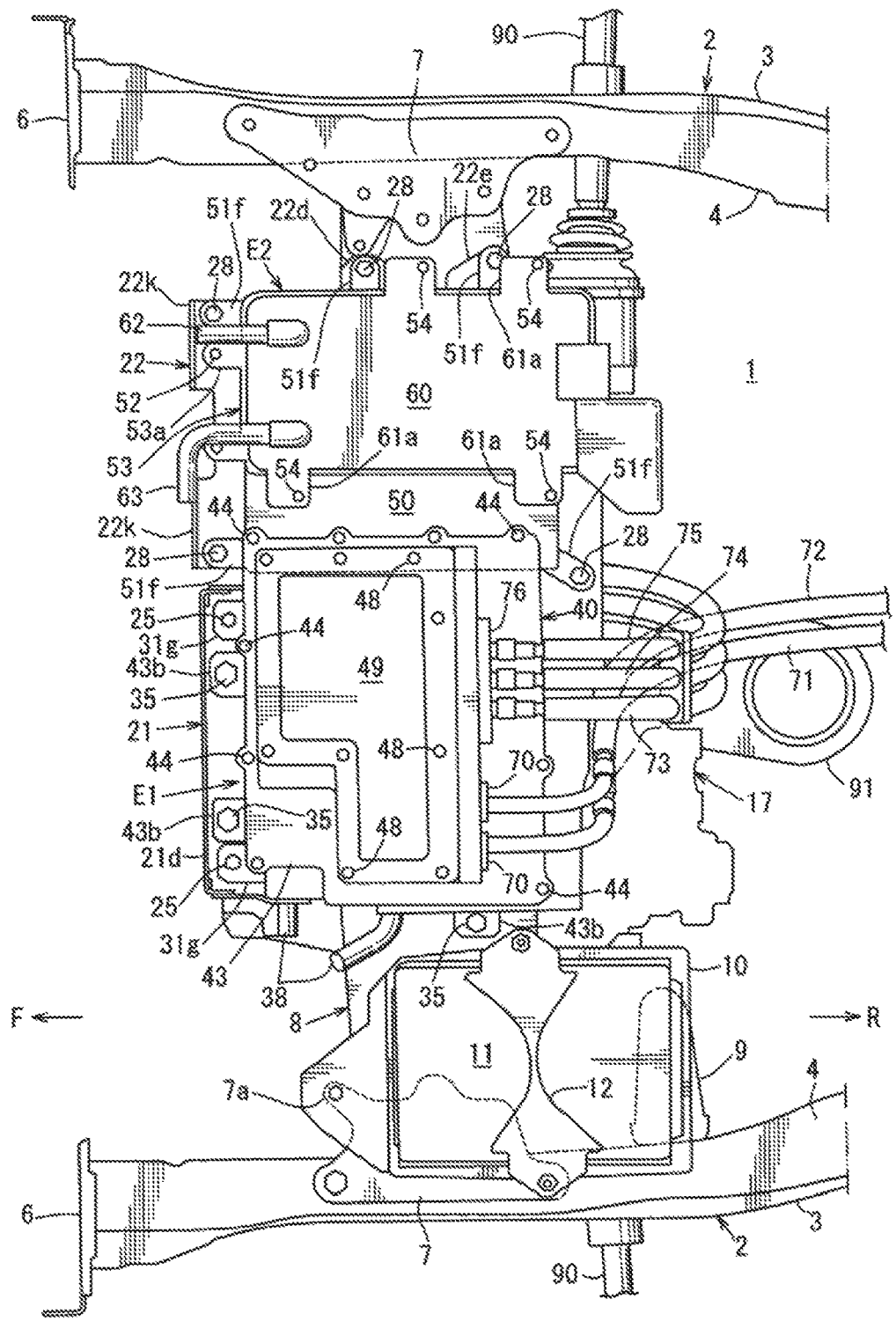
FIG. 3 is a plan view of the electric-drive vehicle structure.
Figure 4:
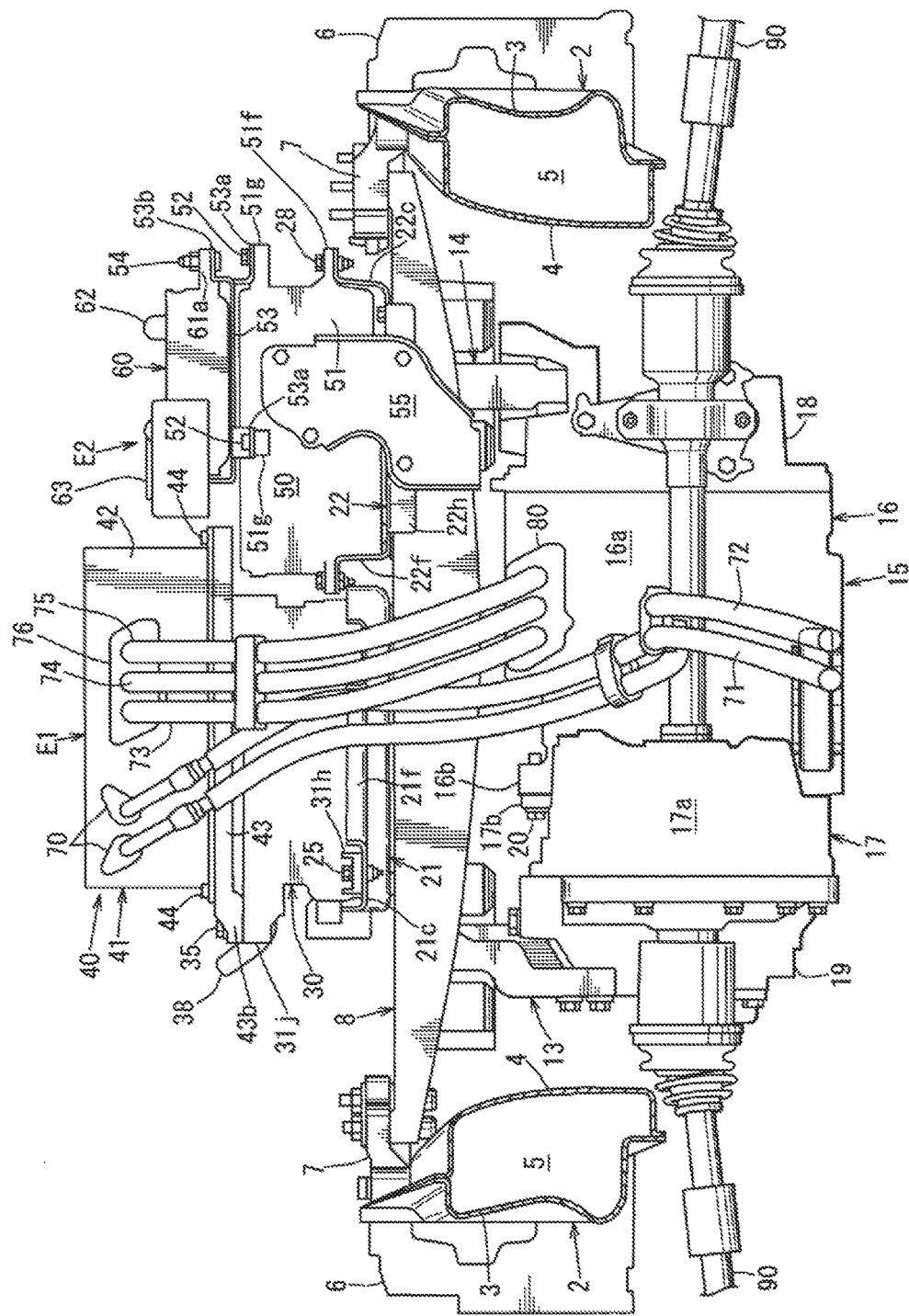
FIG. 4 is a rear view of the electric-drive vehicle structure.

The drawings illustrate the electric-drive vehicle structure, where FIG. 1 illustrate a perspective view of the electric-drive vehicle structure, FIG. 2 illustrates a front view of FIG. 1, FIG. 3 illustrates a plan view of FIG. 1, and FIG. 4 illustrates a rear view of FIG. 1.

In FIGS. 1 to 4, a motor room 1 is disposed in a front part of the vehicle. In detail, a dash lower panel which rises from a front end of a floor panel is provided, the motor room 1 is defined forward of the dash lower panel, and a cabin is defined rearward of the dash lower panel.

Left and right front side frames 2 extending in vehicle longitudinal directions are provided at both left and right sides inside the motor room 1.

As illustrated in FIGS. 3 and 4, each front side frame 2 is a vehicle body reinforcement member in which a closed cross-section 5 (see FIG. 4) extending in the vehicle longitudinal directions is formed by fixedly joining upper and lower flange parts of a front side frame outer 3 and a front side frame inner 4.

As illustrated in FIGS. 1 to 4, at a front end of each front side frame 2, a set plate 6 for attaching a crash can is provided, and the crash can is attached to the set plate 6 through an attachment plate. A bumper reinforcement extending in vehicle width directions is attached between front ends of the left and right crash cans.

As illustrated in FIGS. 1 and 3, mount brackets 7 are fastened to an upper surface of the front side frame inner 4 of the front side frame 2 by using bolts. A cross member 8 is bridged between the pair of left and right front side frames 2 by attaching the cross member 8 extending in the vehicle width directions to the left and right mount brackets 7.

As illustrated in FIGS. 1 and 3, at the left side of the vehicle, a battery support arm 9 is provided immediately rearward of the mount bracket 7. The battery support arm 9 has an inverted L-shape in a front view of the vehicle. This battery support arm 9 is attached to the front side frame inner 4 at a substantially vertical part thereof.

On the other hand, a battery support protrusion 7a extending upwardly is integrally formed with the mount bracket 7 at the left side of the vehicle. As illustrated in FIGS. 2 and 3, a battery 11 is placed on the battery support protrusion 7a and the battery support arm 9 through a battery tray 10. In an intermediate part of the battery tray 10 in the vehicle longitudinal directions, a battery clamp 12 couples upper ends of inner and outer pieces of the battery tray 10 in the vehicle width directions. In this embodiment, the battery 11 may adopt, but not limited to, a 12V lead battery.

Figure 5:
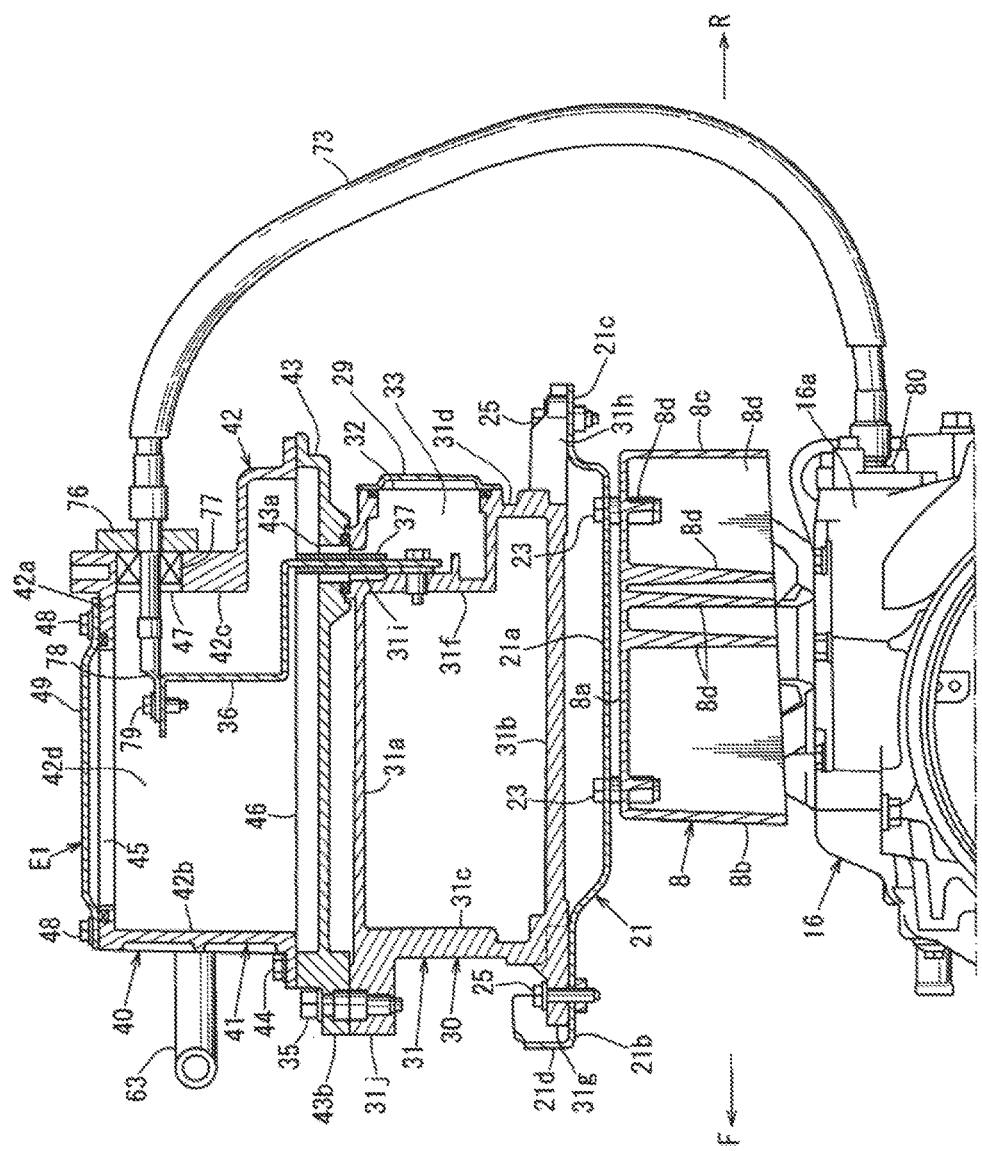
FIG. 5 is a vertical cross-sectional view of a substantial part illustrating a coupling structure of a bus-bar.

FIG. 5 is a vertical cross-sectional view of a substantial part of the electric-drive vehicle structure. As illustrated in this figure, the cross member 8 is formed by casting to have a substantially gate shape in this cross-section which has an upper wall 8a, a front wall 8b, a rear wall 8c, and a plurality of reinforcement ribs 8d. Moreover, an upper surface of the upper wall 8a of the cross member 8 is flat. As illustrated in FIG. 2, center parts of the front wall 8b and the rear wall 8c in the vehicle width directions extend downwardly to be a downward convex and arc shape with respect to both ends of the walls in the vehicle width directions. As illustrated in FIG. 2, recesses or notches 8e which open downwardly are formed at two, left and right locations in an intermediate part of the front wall 8b of the cross member 8 in the vehicle width directions.

As illustrated in FIG. 2, a motor unit 15 is suspended below the cross member 8 by using left and right supporting devices 13 and 14 provided at locations corresponding to the recesses 8e of the cross member 8.

As illustrated in this figure, the motor unit 15 is an integrated unit of a 3-phase AC motor 16 (hereinafter, simply referred to as "the motor 16") for driving the vehicle, which is located at the right side of the vehicle, a transmission 17 which is located at the left side of the vehicle and constitutes a gear-reduction mechanism, a blocking member 18 for blocking an opening which is formed at the right side of a motor housing 16a, and another blocking member 19 for blocking an opening which is formed at the left side of a casing 17a of the transmission 17.

As illustrated in FIG. 2, a flange part 16b provided at the left side of the motor housing 16a and a flange part 17b provided at the right side of the transmission 17 are fastened together with bolts 20.

Here, at the left side of the vehicle, an upper part of the blocking member 19 and a lower part of the supporting device 13 are fastened with bolts inserted inwardly in the vehicle width directions, and at the right side of the vehicle, an upper part of the blocking member 18 and a lower part of the supporting device 14 are fastened with bolts inserted rearwardly in the vehicle longitudinal directions. Thereby, the motor 16 is suspended below the cross member 8.

Figure 6:
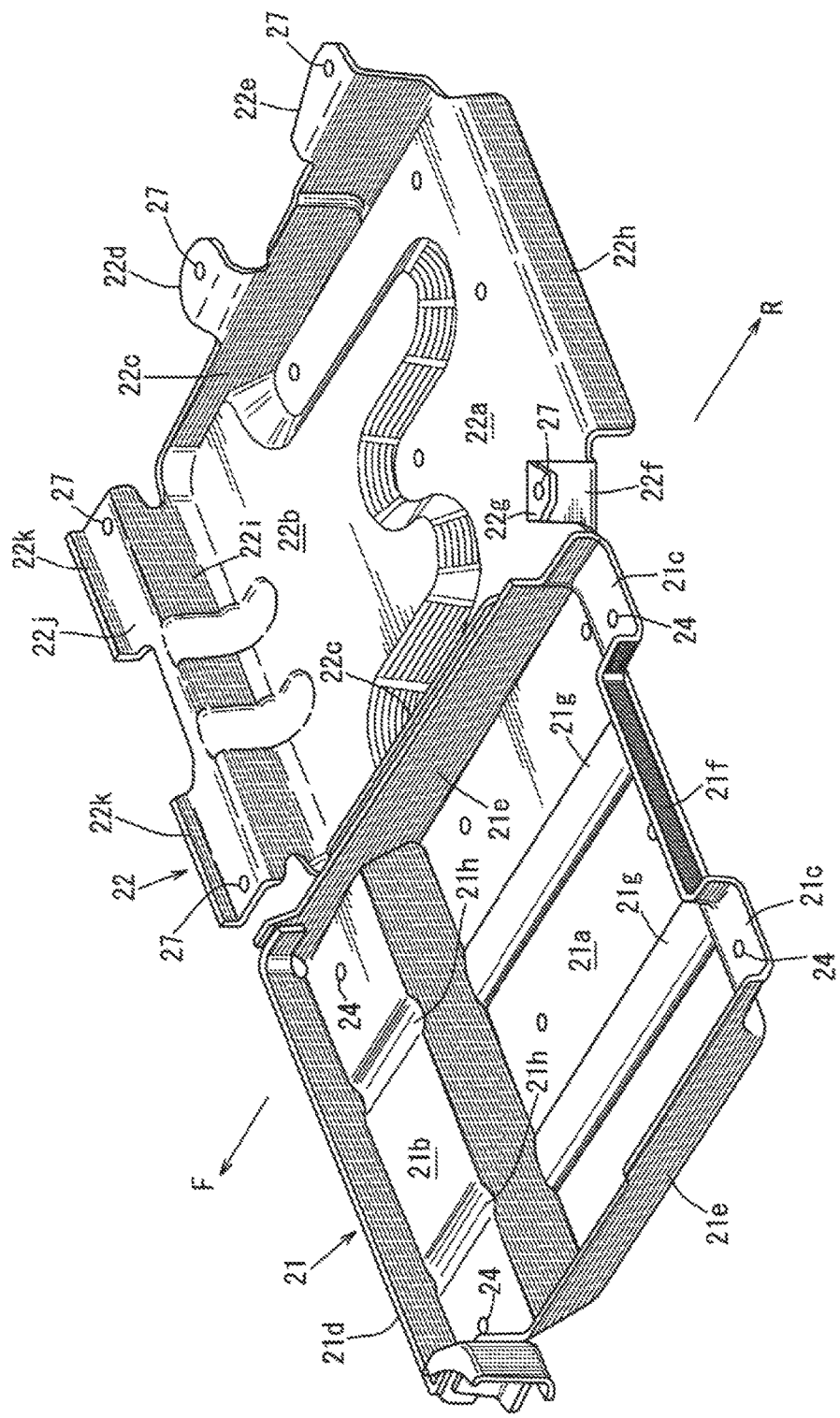
FIG. 6 is a perspective view of a tray.
Figure 7:
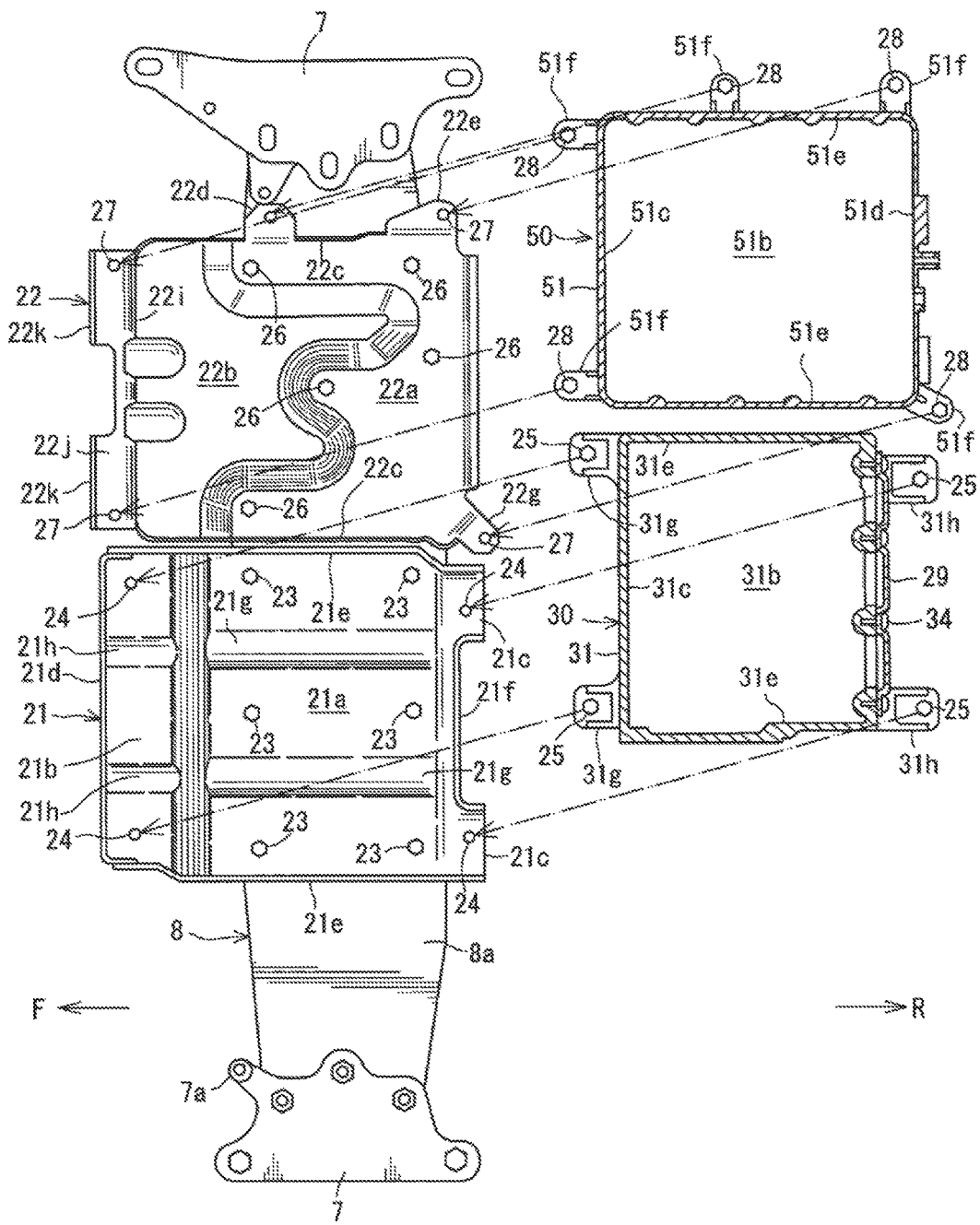
FIG. 7 is an exploded plan view illustrating an attaching structure of an electric unit to the tray.
Figure 8:
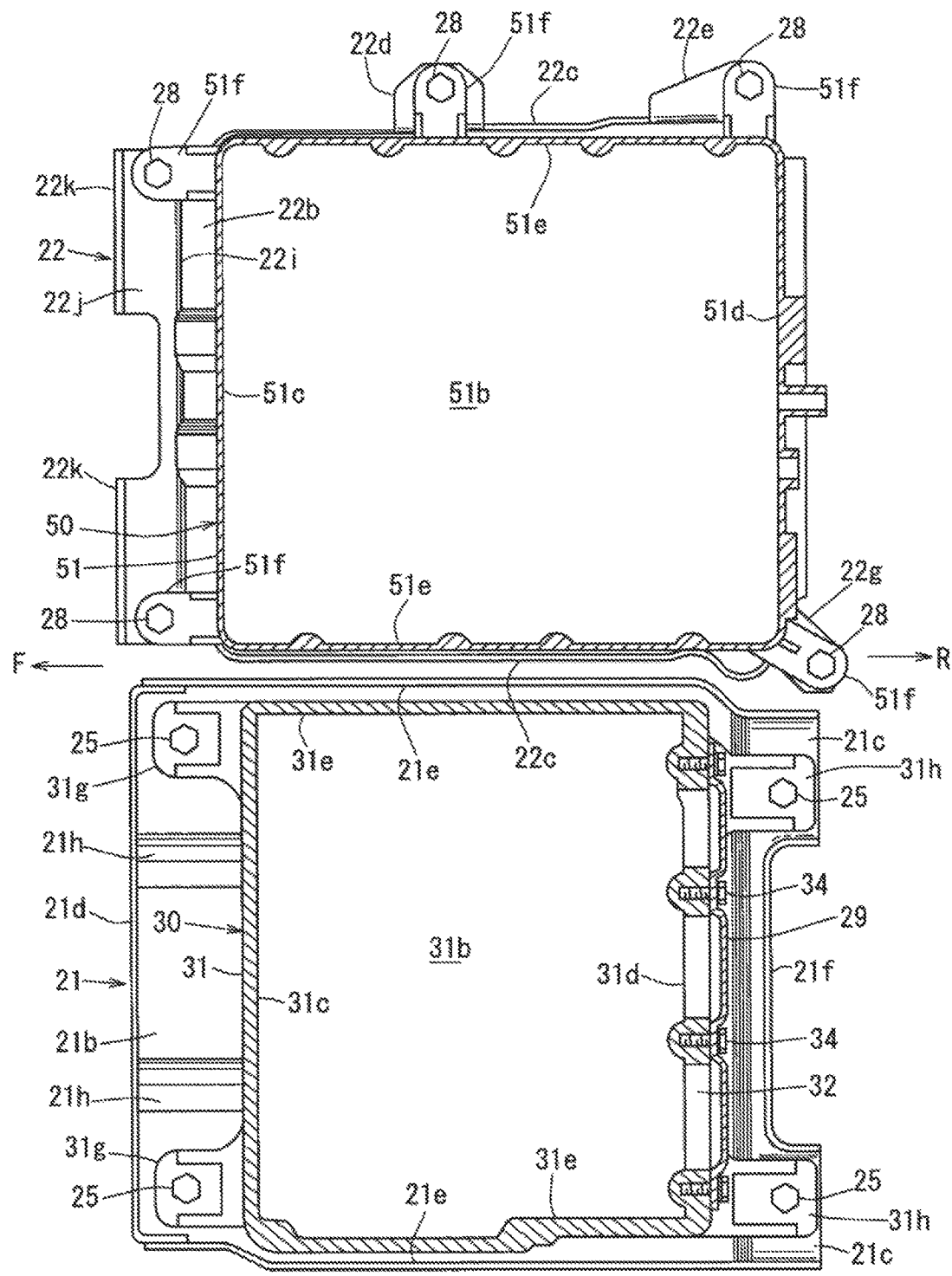
FIG. 8 is a plan view illustrating the electric unit attached to the tray.

FIG. 6 is a perspective view of the tray, FIG. 7 is an exploded plan view illustrating an attaching structure of the electric unit to the tray, and FIG. 8 is a plan view illustrating the electric unit attached to the tray.

As also illustrated in FIG. 2 by the front view, a left tray 21 as the tray is attached to an upper surface of the cross member 8, at a substantially center part in the vehicle width directions. An inverter 30 is placed on the left tray 21, and a junction box 40 is placed on the inverter 30. An electric unit E1 is comprised of the inverter 30 and the junction box 40.

Moreover, as illustrated in FIG. 2, at the right side in the vehicle width directions of the left tray 21 on the cross member 8, a right tray 22 which is the tray is attached. A charger 50 is placed on the right tray 22, and a DC-DC converter 60 is placed on the charger 50. An electric unit E2 is comprised of the charger 50 and the DC-DC converter 60.

The inverter 30 is a high-voltage component for converting DC power at high voltage (e.g., 300V) supplied from a main battery (not illustrated) disposed below the floor panel into 3-phase AC power, and supplying the converted AC power to the motor 16, and is provided with an inverter circuit.

The junction box 40 is comprised of terminals which are used when coupling, branching, and relaying electric wires and a so-called "connection box" for protecting the terminals, and has a relay circuit.

The charger 50 is to charge the main battery by using electric-power input from an external power source, and has a charge circuit. The charger 50 is connected with the main battery via electric power cables (not illustrated). The DC-DC converter 60 is a converter for converting the high voltage into a low voltage (e.g., 12V) for drive on-board instruments.

As illustrated in FIGS. 3 and 5, longitudinal dimensions of the electric units E1 and E2 are greater than the longitudinal dimension of the cross member 8. As illustrated in FIGS. 3 and 5, front edges of cases of the electric units E1 and E2, i.e., front edges of an inverter case 31, a junction box case 41 (see FIG. 5), a charger case 51, and a converter case 61 (see FIG. 2) of the DC-DC converter 60 are located, when installed, forward of the front wall 8b as a front edge of the cross member 8.

As illustrated in FIGS. 6 and 7, the left tray 21 includes a first bottom part 21a which contacts the upper surface of the cross member 8 and is fixed thereto, a second bottom part 21b which is formed continuously from a front part of the first bottom part 21a and is located higher than the first bottom part 21a, and left and right third bottom parts 21c which are formed continuously from left and right rear parts of the first bottom part 21a and are located at the same height as the second bottom part 21b. The first bottom part 21a is fixed to the upper surface of the cross member 8 by using a plurality of bolts 23, and the inverter 30 below the electric unit E1 is fastened at attachment parts 24 of the second bottom part 21b and the third bottom parts 21c by using bolts 25. That is, the first bottom part 21a, the second bottom part 21b, and the third bottom parts 21c are bottom surfaces which provide a fixed part of the inverter 30 below the electric unit E1.

As illustrated in FIGS. 5 to 8, the left tray 21 has, in the plan view, a front edge 21d located, throughout its width, forward of the front edge of the inverter case 31 and the front edge of the junction box case 41. The front edge 21d is formed in a wall shape which rises substantially vertically from the second bottom part 21b as the bottom surface.

As illustrated in FIGS. 6 to 8, the left tray 21 integrally forms left and right side walls 21e which rise from both left and right outer ends in the vehicle width directions of the first bottom part 21a and the second bottom part 21b, and a rear wall 21f which rises upwardly between the third bottom parts 21c so as to couple the third bottom parts 21c.

Moreover, as illustrated in FIG. 6, the first bottom part 21a of the left tray 21 is provided with a plurality of "upwardly-convex" beads 21g which extend parallel to each other in the vehicle longitudinal directions. The beads 21g are separated from each other in the vehicle width directions. Conversely, the second bottom part 21b is provided with a plurality of "downwardly-convex" beads 21h which extend parallel to each other in vehicle longitudinal directions. The beads 21h are separated from each other in the vehicle width directions. The stepped structure of the first bottom part 21a and the second bottom part 21b, and the structure of the beads 21g and 21h reinforce the bottom surface of the left tray 21.

As illustrated in FIGS. 6 and 7, the right tray 22 has a first bottom part 22a which contacts the upper surface of the cross member 8 and is fixed thereto, and a second bottom part 22b which is formed continuously from a front part of the first bottom part 22a and is located higher than the first bottom part 22a.

The right tray 22 integrally forms left and right side walls 22c which rise from both left and right ends of the first bottom part 22a and the second bottom part 22b, attachment pieces 22d and 22e which extend horizontally outward in the vehicle width directions from an upper end of the side wall 22c at the right side in the vehicle width directions, a standing wall 22f which stands up in a rear left corner part of the first bottom part 22a, an attachment piece 22g which extends horizontally and obliquely rearward from an upper end of the standing wall 22f, and a rear wall 22h which is formed by bending downwardly from a rear end of the first bottom part 22a.

Further, the right tray 22 also integrally forms a vertical wall 22i which extends upwardly from a front end of the second bottom part 22b, an attachment piece 22j which extends horizontally and forward of an upper end of the vertical wall 22i, and front walls 22k which extend upwardly from a front end of the attachment piece 22j.

The first bottom part 22a is fixed to the upper surface of the cross member 8 by using a plurality of bolts 26. The attachment pieces 22d, 22e, 22g, and 22j are located at the same height. The charger 50 below the electric unit E2 is fastened to attachment parts 27 formed in the respective attachment pieces 22d, 22e, 22g, and 22j using bolts 28.

The front wall 22k of the right tray 22 is a wall which is located, in the plan view, forward of the front edge of the charger case 51 and the front edge of the converter case 61.

In this embodiment, the left tray 21 and the right tray 22 may be comprised of, but not limited to, a rigid member (e.g., a steel plate having 2.5-mm thickness).

As illustrated in FIG. 5, the case 31 of the inverter 30 which constitutes one of the electric units E1 and E2 (in this case, E1) and the case 41 of the junction box 40 are vertically stacked so that the inverter case 31 is located below the junction box case 41.

As illustrated in FIG. 2, the case 51 of the charger 50 which constitutes the other electric unit E2 and the case 61 of the DC-DC converter 60 are vertically stacked so that the charger case 51 is located below the converter case 61.

As illustrated in FIGS. 5 and 8, the inverter case 31 is formed in a box shape having an upper wall 31a, a lower wall 31b, a front wall 31c, a rear wall 31d, and left and right side walls 31e, and a partition 31f for forming a space 33 which communicates with a rear opening 32 is integrally formed with the inverter case 31.

Moreover, as illustrated in these figures, the inverter case 31 includes a plurality of attachment seats 31g which extend forward of the bottom of the front wall 31c, and a plurality of attachment seats 31h which extend rearward from the bottom of the rear wall 31d. As illustrated in FIG. 5, the attachment seats 31g and 31h are fixedly fastened to the second bottom part 21b and the third bottom parts 21c of the left tray 21 by using the bolts 25, respectively.

Further, as illustrated in FIG. 5, a bus-bar insertion hole 31i is formed in the upper wall 31a of the inverter case 31 so as to communicate with the space 33, and as illustrated in FIGS. 5 and 8, the rear opening 32 is detachably covered with a lid member 29 by using bolts 34.

Further, as illustrated in FIG. 1, a plurality of attachment seats 31j are integrally formed with the inverter case 31 so as to protrude outwardly from upper parts of the inverter case 31.

Note that the inverter case 31 is formed by aluminum die casting.

As illustrated in FIG. 5, the junction box case 41 is also formed by aluminum die casting, and is formed by fastening a box main body 42 and a bottom surface 43 located below the box main body 42 by using a plurality of bolts 44.

As illustrated in this figure, the box main body 42 includes an upper wall 42a, a front wall 42b, a rear wall 42c, and left and right side walls 42*d*, where an upper opening 45, a lower opening 46, and a rear opening 47 are formed.

The upper opening 45 is detachably covered by a lid member 49 using bolts 48, and a bus-bar insertion hole 43*a* which is aligned with the bus-bar insertion hole 31*i* of the inverter case 31 is formed in the bottom surface 43.

As illustrated in FIGS. 1 and 5, in the bottom surface 43, a plurality of attachment seats 43*b* which protrude outwardly are integrally formed corresponding with the attachment seats 31*j* of the inverter case 31. The attachment seats 43*b* of the junction box case 41 are placed on the attachment seats 31*j* of the inverter case 31, and these seats 31*j* and 43*b* are fastened by using a plurality of bolts 35.

As illustrated in FIG. 5, the bolts 35 which fasten the inverter case 31 to the junction box case 41 are thicker, and larger in the shear force than the bolts 25 which fasten the inverter case 31 to the left tray 21. In this embodiment, the bolts 35 may be, but not limited to, M10, while the bolts 25 may be, but not limited to, M8.

As illustrated in FIG. 5, a conducting part inside the junction box 40 is coupled to a conducting part inside the inverter case 31 through a bus-bar 36 made of copper ingot. This bus-bar 36 is wired through the upper and lower bus-bar insertion holes 43*a* and 31*i* between the bottom surface 43 and the space 33, and the perimeter of the wired part is covered with an insulating member 37.

As illustrated in FIGS. 7 and 8, the case 51 of the charger 50 is formed in a box shape having an upper wall (not illustrated), a lower wall 51*b*, a front wall 51*c*, a rear wall 51*d*, and left and right side walls 51*e*. The charger case 51 integrally forms a plurality of attachment seats 51*f* which protrude outwardly from a lower part of the charger case 51. These attachment seats 51*f* are fixedly fastened to the respective attachment pieces 22*d*, 22*e*, 22*g*, and 22*j* of the right tray 22 by using the bolts 28.

As illustrated in FIGS. 1, 2, and 4, the charger case 51 also integrally forms a plurality of attachment seats 51*g* which protrude outwardly from an upper part of the charger case 51, and a plate 53 is attached to the attachment seats 51*g* by using bolts 52.

The plate 53 has a plurality of lower attachment pieces 53*a* and a plurality of upper attachment pieces 53*b*. The lower attachment pieces 53*a* are fixed to the attachment seats 51*g* of the charger case 51, respectively. A plurality of attachment seats 61*a* which protrude outwardly from the converter case 61 of the DC-DC converter 60 are fixedly fastened to the upper attachment pieces 53*b* by using bolts 54, respectively.

As illustrated in FIG. 4 in the rear view, a rear surface of the case 51 of the charger 50 and a rear surface of the rear wall 22*h* of the right tray 22 are mutually coupled by a coupling member 55. The inverter 30 and the DC-DC converter 60, among the inverter 30, the junction box 40, the charger 50, and the DC-DC converter 60 which constitute the electric units E1 and E2, are electric components which need to be cooled by coolant.

Thus, as illustrated in FIGS. 1 to 3, a pair of ports (one inlet and one outlet) 38 which supply and discharge the coolant to/from a water jacket (not illustrated) inside the inverter case 31 are provided to the side wall 31*e* which is located outward in the vehicle width directions in the inverter case 31, at a location as forward as possible in the vehicle longitudinal directions.

Moreover, a pair of ports (one inlet and one outlet) 62 and 63 which supply and discharge the coolant to/from a water jacket (not illustrated) inside the converter case 61 are provided to a front side of the upper wall in the converter case 61 of the DC-DC converter 60.

As illustrated in FIGS. 3 and 4, coupling parts 70 of the electric power cables 71 and 72 for supplying electric power from the main battery (not illustrated) is provided to the rear left side of the junction box case 41 in the junction box 40.

As illustrated in FIGS. 3 and 4, a coupling part 76 of the 3-phase cables 73, 74, and 75 which supply 3-phase AC electric power converted into 3-phase AC by the inverter 30 to the motor 16 below the cross member 8 is provided to the rear right side of the junction box case 41 in the junction box 40.

As illustrated in FIG. 5, upper ends of the 3-phase cables 73 are perpendicular to the coupling part 76. Connecting terminals 78 are provided to tip ends of cable main bodies introduced into the junction box case 41 through a sealing member 77, and these connecting terminals 78 are coupled to horizontal parts at an upper end of the bus-bar 36 using bolts 79.

As illustrated in FIGS. 4 and 5, the 3-phase cables 73, 74, and 75 extend downwardly while being curved smoothly from their upper ends to lower ends. The lower ends of the 3-phase cables 73, 74, and 75 are held by a coupling part 80 on the rear side of the motor housing 16*a* so as to be perpendicular to the coupling part 80.

In FIG. 5, although only one of the 3-phase cables 73, 74, and 75 is illustrated, the rest of two cables are similarly structured for the elements 78, 79, 36, 37, 43*a*, and 31*i*. In addition, the structures for the elements 78, 79, 36, 37, 43*a*, and 31*i* at the upper ends of the two electric power cables 71 and 72 are also similar to the structures of FIG. 5.

Note that 90 indicate drive shafts in FIGS. 1 to 4, and 91 indicates a lower mount bracket of the motor unit 15 in FIG. 3.

As described above, the electric-drive vehicle structure of the embodiment includes the left and right front side frames 2 extending in the vehicle longitudinal directions at both left and right sides inside the motor room 1 disposed in the front part of the vehicle. The cross member 8 extending in the vehicle width directions is bridged between the left and right front side frames 2. The electric unit E1 is placed on the cross member 8, and the motor 16 for driving the vehicle to which electric power is supplied from the electric unit E1 is suspended below the cross member 8. In this electric-drive vehicle structure, the longitudinal dimension of the electric unit E1 is greater than the longitudinal dimension of the cross member 8. The front edge of the case of the electric unit E1 (see the inverter case 31 and the junction box case 41) is located, when installed, forward of the front edge of the cross member 8. The tray (the left tray 21) having the bottom surface (see the first bottom part 21*a* and the second bottom part 21*b*) which provides the fixed part below the electric unit E1 is attached to the upper surface of the cross member 8. The tray (the left tray 21) has the front edge 21*d* which is located, throughout its width, forward of the front edge of the case of the electric unit E1 in the plan view (see FIGS. 1, 2, and 5).

According to this structure, since the front edge 21*d* of the tray (the left tray 21) is located, throughout its width, forward of the case of the electric unit E1 (the inverter case 31 and junction box case 41) in the plan view, the rearwardly-moving part(s) contacts the front edge 21*d* of the tray (the left tray 21) prior to other components, when a frontal collision of the vehicle occurs, thereby the rearwardly-moving part(s) are caught. As a result, the electric unit E1 can be protected by the front edge 21*d* of the tray (the left tray 21).

In one embodiment of the present disclosure, the front edge 21d of the tray (the left tray 21) is formed in the wall shape which rises substantially vertically from the bottom surface (the second bottom part 21b) (see FIG. 5).

According to this structure, since the rearwardly-moving part(s) are securely caught by the front edge 21d of the wall-like tray (the left tray 21) which rises substantially vertically from the bottom surface, the electric unit E1 can be protected more effectively.

In one embodiment of the present disclosure, the bottom surface of the tray (the left tray 21) has the first bottom part 21a which contacts and is fixed to the upper surface of the cross member 8, and the second bottom part 21b which is formed continuously from the front part of the first bottom part 21a and is located higher than the first bottom part 21a, and to which the lower part of the electric unit E1 (in this embodiment, the lower part of the inverter case 31) is fixed (see FIG. 5).

According to this structure, since the bottom surface of the tray (the left tray 21) is formed in the stepped structure with the first bottom part 21a and the second bottom part 21b, the bottom surface of the tray (the left tray 21) can be reinforced.

Regarding the correspondence of the structure of the present disclosure and the structure of this embodiment, the case of the electric unit of the present disclosure corresponds to the inverter case 31 and the junction box case 41 of this embodiment, the tray corresponds to the left tray 21, and the bottom surface of the tray corresponds to the first bottom part 21a and the second bottom part 21b; however, the present disclosure is not limited to the structure of this embodiment.

As described above, the present disclosure is useful for the electric-drive vehicle structure in which the left and right front side frames extending in the vehicle longitudinal directions are provided at both left and right sides inside the motor room disposed in the front part of the vehicle, the cross member extending in the vehicle width directions is bridged between the left and right front side frames, the electric unit is placed on the cross member, and the vehicle driving motor to which electric power is supplied from the electric unit is suspended below the cross member.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Motor Room
2 Front Side Frame
8 Cross Member
16 Motor
21 Left Tray (Tray)
21a First Bottom Part (Bottom Surface)
21b Second Bottom Part (Bottom Surface)
21d Front Edge
31 Inverter Case (Case of Electric Unit)
41 Junction Box Case (Case of Electric Unit)
E1 Electric Unit

What is claimed is:

1. An electric-drive vehicle structure, comprising:
a cross member bridged between front side frames in a front of a vehicle;
a motor suspended below the cross member;
a tray fixed to an upper surface of the cross member; and
an electric unit for driving a motor, fixed onto the tray,
wherein a front edge of the electric unit is located forward of a front edge of the cross member,
wherein the tray has a front edge located, throughout a width thereof, forward of the electric unit,
wherein the front edge of the tray is a wall part rising substantially vertically,
wherein a longitudinal dimension of the tray is greater than a longitudinal dimension of the cross member, and
wherein the tray has attachment pieces aligned with attachment seats provided to a lower part of the electric unit, at locations forward of the cross member and rearward of the cross member.

2. The electric-drive vehicle structure of claim 1, wherein the tray has a first bottom part fastened to the upper surface of the cross member, and a second bottom part that is formed continuously from a front part of the first bottom part and located higher than the first bottom part, and
wherein the attachment seats are provided to the second bottom part.

* * * * *